United States Patent [19]

Vassiliou

[11] 4,039,713

[45] Aug. 2, 1977

[54] FLUOROCARBON PRIMER HAVING IMPROVED SCRATCH RESISTANCE

[75] Inventor: Eustathios Vassiliou, Newark, Del.

[73] Assignee: E. I. Du Pont de Nemours and Company, Wilmington, Del.

[21] Appl. No.: 600,576

[22] Filed: July 31, 1975

[51] Int. Cl.$^2$ .............. B32B 19/00; C08L 27/18; B32B 27/00
[52] U.S. Cl. .............. 428/324; 260/29.2 N; 260/29.6 F; 260/857 L; 260/857 UN; 260/42.15; 260/42.27; 260/42.49; 106/83; 106/84; 427/38 BR; 427/409; 428/330; 428/328; 428/327; 428/404; 428/422; 428/428; 428/469; 428/432; 428/435; 428/454; 428/457; 428/458; 428/539
[58] Field of Search ............... 428/422, 469, 324, 454, 428/458, 539, 330, 404, 457, 428, 432, 435, 327; 260/29.6 F, 857 L, 857 UM, 29.2 N, 42.15, 42.27, 42.49; 106/74, 83, 84; 427/331, 388 R, 409

[56] References Cited
U.S. PATENT DOCUMENTS

| | | | |
|---|---|---|---|
| 2,710,266 | 6/1955 | Hochberg | 428/422 |
| 2,825,664 | 3/1958 | Huntsberger | 260/29.6 F |
| 2,961,341 | 11/1960 | Long | 428/422 |
| 2,979,418 | 4/1961 | Dipner | 428/422 |
| 3,087,827 | 4/1963 | Klenke | 106/291 |
| 3,087,828 | 4/1963 | Linton | 106/296 |
| 3,087,829 | 4/1963 | Linton | 106/291 |
| 3,432,511 | 3/1969 | Reitling | 260/29.6 F |
| 3,661,831 | 5/1972 | Fang | 260/29.6 F |
| 3,663,728 | 5/1972 | Hoback | 260/29.2 N |
| 3,787,338 | 1/1974 | Skelly | 260/29.6 F |
| 3,970,627 | 7/1976 | Seymus | 428/422 |

*Primary Examiner*—Ellis Robinson

[57] ABSTRACT

Compositions containing
 a. fluoropolymer,
 b. alkali metal silicate,
 c. the salt of a polyamide acid,
 d. a coalescing agent,
 e. mica particles, mica particles coated with pigment, or metal flake, and
 f. a liquid carrier
are useful for priming metal, especially cookware, before topcoating it with a fluoropolymer enamel.

23 Claims, No Drawings

FLUOROCARBON PRIMER HAVING IMPROVED SCRATCH RESISTANCE

BACKGROUND OF THE INVENTION

Cookware coated with fluoropolymers, especially polytetrafluoroethylene (PTFE), has come into widespread use in recent years. Many cooks prefer to use such cookware because of its non-stick properties and because it is so easy to clean.

It is well known that the adhesion of fluoropolymers to metal is of a rather low order, so in the fabrication of such cookware it is customary to improve adhesion by applying a primer composition to the metal before applying the fluoropolymer topcoat. Such a primer composition is described in U.S. application Ser. No. 597,493, filed July 21, 1975 now U.S. Pat. No. 4,016,125. The composition described there comprises a. a fluoropolymer,
b. a binder comprising an alkali metal silicate and the amine salt of a polyamide acid,
c. a coalescing agent, and
d. a liquid carrier.

While cookware primed with such a composition is quite durable, its entire fluoropolymer coating tends to become scratched after extended use.

SUMMARY OF THE INVENTION

It has now been found that the scratch resistance of such a coating is improved if the primer composition contains mica particles, mica particles coated with pigment, or metal flake.

DETAILED DESCRIPTION OF THE INVENTION

The mica particles, coated mica particles and metal flake used in the compositions of the invention can be any of those available commercially. These particles and flakes have an average longest dimension of 10 to 200 microns, preferably 15-50 microns, with no more than 50° of the particles or flakes having longest dimensions of more than about 500 microns. Particle and flake size is measured optically against a standard.

The mica particles coated with pigment preferred for use are those described in U.S. Pat. No. 3,087,827 to Klenke and Stratton, and U.S. Pat. Nos. 3,087,828 and 3,087,829 to Linton. The disclosures of these patents are incorporated into this specification to describe the various coated micas and how they are prepared.

The micas described in these patents are coated with oxides or hydrous oxides of titanium, zirconium, aluminum, zinc, antimony, tin, iron, copper, nickel, cobalt, chromium or vanadium. Titanium dioxide coated mica is preferred because of its availability. Mixtures of coated micas can also be used.

Representative of the metal flake which can be used are aluminum flake, stainless steel flake, nickel flake and bronze flake. Mixtures of flake can also be used.

The mica, coated mica or metal flake is ordinarily present in a composition of the invention at a concentration of about 0.2-20%, by weight of the total solids, preferably about 2-15%, even more preferably about 5-12%. "Total solids" means the sum of fluoropolymer, mica, coated mica or metal flake polyamide acid, pigment and alkali metal silicate content.

The fluoropolymers used in the compositions of the invention are homopolymers and copolymers (meaning the polymer contains two or more different monomer units) of monoethylenically unsaturated hydrocarbon monomers completely substituted with fluorine atoms or completely substituted with a combination of fluorine atoms and chlorine atoms. Included in this group are perfluorolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and the normally solid copolymers of tetrafluoroethylene and perfluoroalkyl vinyl ethers (wherein the alkyl group is of 1-5 carbon atoms). Mixtures of these can also be used. PTFE is preferred for its thermal stability.

The fluoropolymer used is particulate. The particles are preferably small enough to pass through the nozzle of a spray gun without clogging it and are also small enough to give the resulting film integrity.

The fluoropolymer should have a number average molecular weight of at least about 20,000, for a polymer with a molecular weight of less than this tends to be waxy and unsuited for use. The number average molecular weight is preferably at least 200,000. Number average molecular weight of PTFE is measured by the method described by Suwa, Takehisa and Machi in Journal of Applied Polymer Science, Volume 17, pp. 3253-3257 (1973). The number average molecular weight of a tetrafluoroethylene/hexafluoropropylene copolymer is measured by first determining its melt flow rate (MFR) according to ASTM D2116, using the MFR to determine melt viscosity (MV) according to the equation $$MV = \frac{\pi \times \text{pressure used (mm)} \times \text{orifice radius (mm)}}{8 \times MFR \times \text{orifice length (mm)}}$$

and then determining molecular weight (MW) according to the equation $$MW = \sqrt[3.4]{\frac{MV}{1.62 \times 10^{-13}}}$$

Number average molecular weight of a fluorochlorocarbon polymer is measured by ASTM D1430.

Although a powder of fluoropolymer can be used and a carrier provided separately, a polymer in the form of an aqueous dispersion is preferred for its stability and because it is most easily obtained in that form.

The fluoropolymer is ordinarily present in the composition at a concentration of about 10-90%, preferably about 60-80% by weight of the total of fluoropolymer and binder (as will be defined later).

The binder in the compositions of the invention comprises an alkali metal silicate and the amine salt of a polyamide acid. This binder is ordinarily present in the composition at a concentration of about 10-90%, preferably about 20-40%, by weight of the total of fluoropolymer and binder.

The alkali metal silicate component of the binder can be any alkali metal silicate having an alkali metal oxide mol content within the range of from a trace amount to about 20% of the total number of mols of alkali metal oxide and silicon dioxide.

"Trace amount" is used in the conventional sense of meaning a quantity so small that it is not detectable at all or is barely detectable.

"Alkali metal" silicate means a silicate of sodium, potassium, lithium, rubidium, cesium or frankium. Of these, the silicates of lithium, sodium and potassium having alkali metal oxide mol contents of about 1–12% of the total number of mols or alkali metal oxide and silicon dioxide are preferred for use because of their stability.

Mixtures of alkali metal silicates can also be used.

The alkali metal silicate component can be made by blending a commercially available alkali metal silicate containing more than 20 mol percent of alkali metal oxide with a commercially available colloidal silica to obtain an alkali metal silicate having the desired alkali metal oxide content.

The alkali metal silicate is ordinarily present in the binder at a concentration of about 5–95%, preferably about 10–80%, by weight of the binder.

The polyamide acid salt component of the binder can be any of these described in copending application Ser. No. 546,998, filed on Feb. 4, 1975, now U.S. Pat. No. 4,014,834 by Thomas P. Concannon. The portions of that application which describe these polyamide acid salts and how they are made are incorporated into this application by reference.

Generally speaking, the polyamide acid salts use in the compositions of the invention are those of polyamide acids with tertiary amines.

The polyamide acids can be represented by the structure

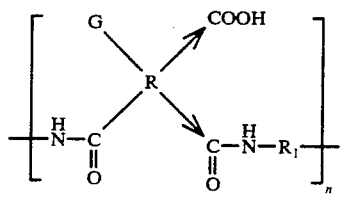

where
G is hydrogen or a carboxyl group;
→ denotes isomerism;
R is a tetravalent organic radical containing at least two carbon atoms, no more than two carbonyl groups of each polyamide acid unit being attached to any one carbon atom of said tetravalent radical;
$R_1$ is a divalent radical containing at least two carbon atoms, the amide groups of adjacent polyamide acid units each being attached to separate atoms of said divalent radical; and
n is a number large enough to give the polyamide acid an inherent viscosity of at least 0.1, measured as a 0.5% solution in N,N-dimethyl acetamide at 30° C.

These polyamide acids are neutralized with stoichiometric amounts of tertiary amines to give the amine salts.

The amine salts of polyamide acids preferred for use in the binder component are those prepared from at least one amine represented by the structure $$H_2N - R_1 - NH_2$$

and at least one acid anhydride represented by the structure

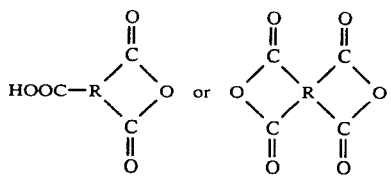

where, in both structures, R and $R_1$ are as previously defined, neutralized with a stoichiometric amount of a tertiary amine.

The amine salts of polyamide acids especially preferred for use in the binder component are those prepared from 1. meta- or para-phenylenediamines, bis(4-amino-phenyl) ether, benzidine, 2,2-bis(4'-amino-phenyl) propane, bis(4-aminophenyl)methane, bis(4-aminophenyl)sulfone, bis(4-aminophenyl) sulfide or 1,6-hexamethylenediamine; and 2. pyromellitic dianhydride, trimellitic anhydride 2,2-bis(3',4'-dicarboxyphenyl)propane dianhydride, or bis(3,4-dicarboxyphenyl)ether dianhydride, neutralized with a stoichiometric amount of trimethylamine, triethylamine, dimethylethanolamine, diethyl 2-hydroxyethylamine, tributylamine, tris(2-hydroxyethyl)amine, ethyl bis(2-hydroxyethyl) amine, N,N-dimethylaniline, morpholine, pyridine, N-methylpyrrole, or mixtures of these.

The polyamide acid salt most preferred for use in the binder component is one prepared from (bis(4-aminophenyl) methane and trimellitic anhydride, neutralized with a stoichiometric amount of a 2/1 weight ratio mixture of triethylamine and diethyl 2-hydroxyethylamine.

The amine salt is ordinarily present in the binder at a concentration of about 5–95%, preferably about 20–90%, by weight of the binder.

The coalescing agent used in the composition of the invention is, generally speaking, an organic liquid which can dissolve the polyamide acid amine salt used. Organic liquids of this type are highly polar and have boiling points above 100° C. Illustrative are N-methylpyrrolidone
dimethylformamide
dimethylacetamide
dimethylsulfoxide
cresylic acid
sulfolane and
formamide.

The coalescing agent preferred for use because of its availability and low toxicity is N-methylpyrrolidone.

The coalescing agent is ordinarily present in the compositions of the invention at a concentration of about 10–90% by weight of the polyamide acid amine salt used, preferably about 20–50%.

The compositions of the invention will have more workable viscosities at higher solids content if they contain about 15–200%, preferably about 80–150%, by weight of the polyamide acid amine salt used, of a viscosity reducing agent which is an organic liquid whose solubility parameter, $\delta_T$, falls within the range of 10–21.6 and which is miscible with water. A definition of solubility parameter apears in KirkOthmer, "Encyclopedia of Chemical Technology", second edition (1963), pages 889–896. Total solubility parameter, $\delta_T$, has the following component parameters:

| | |
|---|---|
| Dispersion component, $\delta_D$ | 7.0–10.0 |
| Polar component, $\delta_P$ | 2.0–11.0 |
| Hydrogen bonding component, $\delta_H$ | 7.0–14.0 | where the equation $$\delta_T^2 = \delta_D^2 + \delta_P^2 + \delta_H^2$$

describes the relationship of the components to the total solubility parameter.

Illustrative of such viscosity reducing agents are furfuryl alcohol, 1-butanol, 2-propanol, ethylene glycol monoethyl ether, triethylene glycol, formic acid and mixtures of these. Furfuryl alcohol is preferred for its effectiveness.

The compositions of the invention can also contain such conventional additives as pigments, flow control agents, surfactants and plasticizers as are necessary or seem desirable. These additives are added for the usual reasons, in the usual ways and in the usual amounts.

The carrier used in the compositions of the invention can be any of those normally used in compositions of this type. It is an inert, not a reactive or functional (in the sense of contributing to the working of the invention) component and its nature is therefore of secondary importance The carrier serves only to keep the composition homogenous and acts as a mechanism for conveying the solid components to the substrate. After a coating has been deposited, the carrier evaporates. It is necessary, therefore, only that it be compatible with the other components of the composition and that it have no adverse effects on the coating itself.

Commonly, the fluoropolymer used in the composition is provided in the form of an aqueous dispersion, and the water introduced into the composition with the polymer also serves as all or as part of the carrier for the composition. Organic liquids such as alcohols, ketones, aliphatic and aromatic hydrocarbons, or mixtures of these, can also be used.

The amount of total solids in the coating compositions will be governed by the substrate to which the compositions are to be applied, the method of application, the curing procedures, and like factors. In the usual case, the composition will contain about 10–80%, by weight, or solids.

The compositions can be made by simply mixing together appropriate amounts of the proper components. Pigments can be added, if this desired, by first conventionally preparing a suitable pigment dispersion and then adding this dispersion to the composition.

The resulting compositions can be applied by spraying, brushing, roller coating, dipping, or by electrodeposition. The substrate is preferably pretreated by grit blasting, by the flame spraying of metals or metal oxides, or by fritcoating, although the compositions can also be applied to phosphated and chromated metals.

A composition of the invention is ordinarily applied to a thickness of about 2–15 microns (dry) and is then air-dried. This primer coat is then topcoated with a conventional clear or pigmented fluoropolymer enamel and baked in the usual way to give an adherent fluoropolymer coating.

Although the best coating is obtained with the two-coat system just described, a strongly adherent fluoropolymer coating can be obtained with a one-coat operation. To do this, a coat of a composition of the invention is applied to a thickness of 50–50 microns (dry). This coat is then air-dried and baked at a temperature high enough to fuse the fluoropolymer used.

The compositions of the invention are most useful for priming metal cookware, especially frypans, before coating them with PTFE, but the compositions can also be used to prime other articles requiring tightly bonded fluoropolymer coatings. These other articles can be made of glass or any other material capable of withstanding the baking temperatures used. For example, the compositions can be used to prime or coat bearings, valves, wire, metal foil, boilers, pipes, ship bottoms, oven liners, iron soleplates, waffle irons, ice cube trays, show shovels and plows, chutes, conveyors, dies, tools such as saws, files and drills, hoppers and other industrial containers and molds.

The following example illustrates the invention. In this example, all parts and percentages are by weight unless indicated otherwise.

EXAMPLE

The following were added to a vessel in the order given and mixed:

| (A) | (1) | The polyamide acid amine salt solution of Example 1 of application SN 546,998, filed February 4, 1975 (containing 18% of furfuryl alcohol and 10% of N-methyl pyrrolidione) | 31.98 parts |
|---|---|---|---|
| | (2) | Furfuryl alcohol | 3.21 parts |
| | (3) | Deionized water | 109.47 parts |
| | (4) | Pigment dispersion Made by ball-milling a mixture of    Cobalt oxide 45 parts    Water 55 parts | 27.39 parts |
| | (5) | TiO$_2$ coated mica ("Afflair" NF-152-D, sold by E. I. du Pont de Nemours and Company) | 7.6 parts | component (5) was added with vigorous mixing. After the addition was complete, the product was stirred for 10 minutes. To it were then added, with mixing

| | | | |
|---|---|---|---|
| | (6) | PTFE dispersion (60% solids in water, "Teflon" TFE-Fluorocarbon Resin, Aqueous Dispersion, T-30, sold by E. I. du Pont de Nemours and Company) | 91.17 parts |
| | (7) | Polysilicate 85 (a lithium silicate sol, 21% solids, sold by E. I. du Pont de Nemours and Company) | 55.2 parts |

The resulting primer composition was sprayed on a degreased aluminum panel to a thickness of about 8 microns (dry) and air-dried.

A topcoat composition was prepared by adding the following to a vessel in the order stated, with mixing:

| (B) | (8) | The PTFE dispersion of (6) above | | 179.7 parts |
|---|---|---|---|---|
| | (9) | Deionized water | | 2.7 parts |
| | (10) | TiO$_2$ coated mica of (5) above | | 9.5 parts |
| | (11) | Pigment dispersion of (4) above | | 3.5 parts |
| | (12) | Mixture of    Toluene    Triethanolamine    Butyl carbitol    Oleic parts    Cerium octoate    solution (12% in | 11.24 parts 14.78 parts 4.27 parts 4.72 parts 2.88 parts | |

| | | |
|---|---|---|
| | 2-ethylhexanoic acid) | |
| | "Triton X-100" (non-ionic surfactant sold by Rohm & Haas Co.) | 1.61 parts |
| (13) | Methyl methacrylate/ ethyl acrylate/ methacrylic acid 39/57/4 terpolymer dispersion (40% in water) | 33.4 parts |

The resulting topcoat composition was sprayed to a thickness of about 20 microns on the panel primed in (A). The panel was then baked for five minutes at 425° C.

The resulting finished showed significantly better scratch resistance than the same one lacking the coated mica component.

I claim:

1. A coating composition comprising
   a. about 10%–90%, by weight of the total of (a) and (b) solids, of a polymer of monoethylenically unsaturated hydrocarbon monomers completely substituted with fluorine atoms or a combination of fluorine atoms and chlorine atoms, the polymer having a number average molecular weight of at least 20,000;
   b. about 10%–90%, by weight of the total of (a) and (b) solids, or a binder which comprises
      1. about 5–95% by weight of the total of (1) and (2) solids, of an alkali metal silicate having an alkali metal oxide mol content within the range of from a trace amount to about 20% of the total number of mols alkali metal oxide and silicon dioxide; and about 5–95%, by weight of the total of (1) and (2) solids, of a salt of polyamide acid represented by the structure

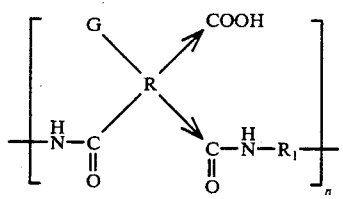

where
G is hydrogen or a carboxyl group;
→ denotes isomerism;
R is a tetravalent organic radical containing at least two carbon atoms, no more than two carbonyl groups of each polyamide acid unit being attached to any one carbon atom of said tetravalent radical;
$R_1$ is a divalent radical containing at least two carbon atoms, the amide groups of adjacent polyamide acid units each being attached to separate atoms of said divalent radical; and
n is a number large enough to give the polyamide acid an inherent viscosity of at least 0.1, measured as a 0.5% solution in N,N-dimethylacetamide at 30° C., neutralized with a stoichiometric amount of a tertiary amine;
   c. about 10–90%, by weight of the polyamide acid amine salt, of N-methyl pyrrolidone, dimethylformamide, dimethylacetamide, dimethylsulfoxide, cresylic acid, sulfolane or formamide;
   d. about 0.2–20%, by weight of the total of (a), (b), (c) and (d) solids, of mica particles, mica particles coated with pigment, or metal flake; and
   e. a liquid carrier.

2. The composition of claim 1 additionally containing about 15–200% of an organic liquid, miscible with water, having a solubility parameter of about 10–21.6, the parameter having a dispersion component of about 7–10, a polar component of about 2–11 and a hydrogen bonding component of about 7–14, where the equation $\delta T^2 = \delta D^2 + \delta P^2 + \delta H^2$ describes the relationship of the components to the total solubility parameter.

3. The composition of claim 2 wherein the organic liquid is furfuryl alcohol, 1-butanol, 2-propanol, ethylene glycol monomethyl ether, triethylene glycol, formic acid, or a mixture of these.

4. The composition of claim 1 wherein the alkali metal silicate is of sodium, potassium or lithium.

5. The composition of claim 1 wherein the salt of the polyamide acid is one prepared from at least one amine represented by the structure

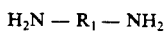

and at least one acid anhydride represented by the structure

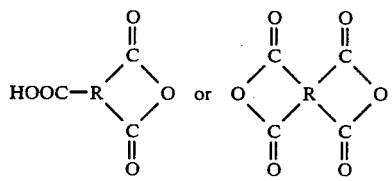

where, in both structures, R and $R_1$ are as defined in claim 1,
neutralized with a stoichiometric amount of tertiary amine.

6. The composition of claim 5 wherein the salt of a polyamide acid is one prepared from
   a. meta- or para-phenylene diamine, bis(4-aminophenyl) ether, benzidine, 2,2-bis(4'-aminophenyl)propane, bis(4-aminophenyl)methane, bis(4-aminophenyl)sulfone, bis(4-aminophenyl)sulfide or 1,6-hexamethylenediamine, and
   b. pyromellitic dianhydride, trimellitic anhydride 2,2-bis(3',4'-dicarboxyphenyl)propane dianhydride or bis(3,4-dicarboxyphenyl) ether dianhydride,
neutralized with a stoichiometric amount of a tertiary amine.

7. The composition of claim 1 wherein the fluorocarbon polymer is PTFE.

8. The composition of claim 1 wherein the carrier is water.

9. The composition of claim 1 wherein the (d) component is mica particles coated with $TiO_2$.

10. The composition of claim 1 comprising
    a. PTFE;
    b. lithium silicate;
    c. the salt of a polyamide acid prepared from trimellitic anhydride and bis(4-aminophenyl)methane, neutralized with a 2/1 weight ratio combination of triethylamine and diethyl 2-hydroxy ethylamine;
    d. water as a carrier.

11. The composition of claim 8 additionally containing about 15–200%, of furfuryl alcohol.

12. An article bearing a primer coat of the composition of claim 1, topcoated with a fused fluoropolymer enamel.

13. An article bearing a primer coat of the composition of claim 2, topcoated with a fused fluoropolymer enamel.

14. An article bearing a primer coat of the composition of claim 3, topcoated with a fused fluoropolymer enamel.

15. An article bearing a primer coat of the composition of claim 4, topcoated with a fused fluoropolymer enamel.

16. An article bearing a primer coat of the composition of claim 5, topcoated with a fused fluoropolymer enamel.

17. An article bearing a primer coat of the composition of claim 6, topcoated with a fused fluoropolymer enamel.

18. An article bearing a primer coat of the composition of claim 7, topcoated with a fused fluoropolymer enamel.

19. An article primer coat of the composition of claim 8, topcoated with a fused fluoropolymer enamel.

20. An article bearing a primer coat of the composition of claim 9, topcoated with a fused fluoropolymer enamel.

21. An article bearing a primer coat of the composition of claim 10, topcoated with a fused fluoropolymer enamel.

22. An article bearing a primer coat of the composition of claim 11, topcoated with a fused fluoropolymer enamel.

23. In a method for improving the adhesion of a fluoropolymer coating to its substrate, the improvement comprising priming the substrate, before the fluoropolymer coating is applied, with a composition according to claim 1.

* * * * *